May 22, 1962     A. M. YOUNG     3,035,789
CONVERTIPLANE

Filed Nov. 27, 1957     8 Sheets-Sheet 1

INVENTOR.
Arthur M. Young
BY
Kenyon & Kenyon
ATTORNEYS

May 22, 1962  A. M. YOUNG  3,035,789
CONVERTIPLANE
Filed Nov. 27, 1957  8 Sheets-Sheet 4

INVENTOR.
Arthur M. Young
BY
Kenyon & Kenyon
ATTORNEYS

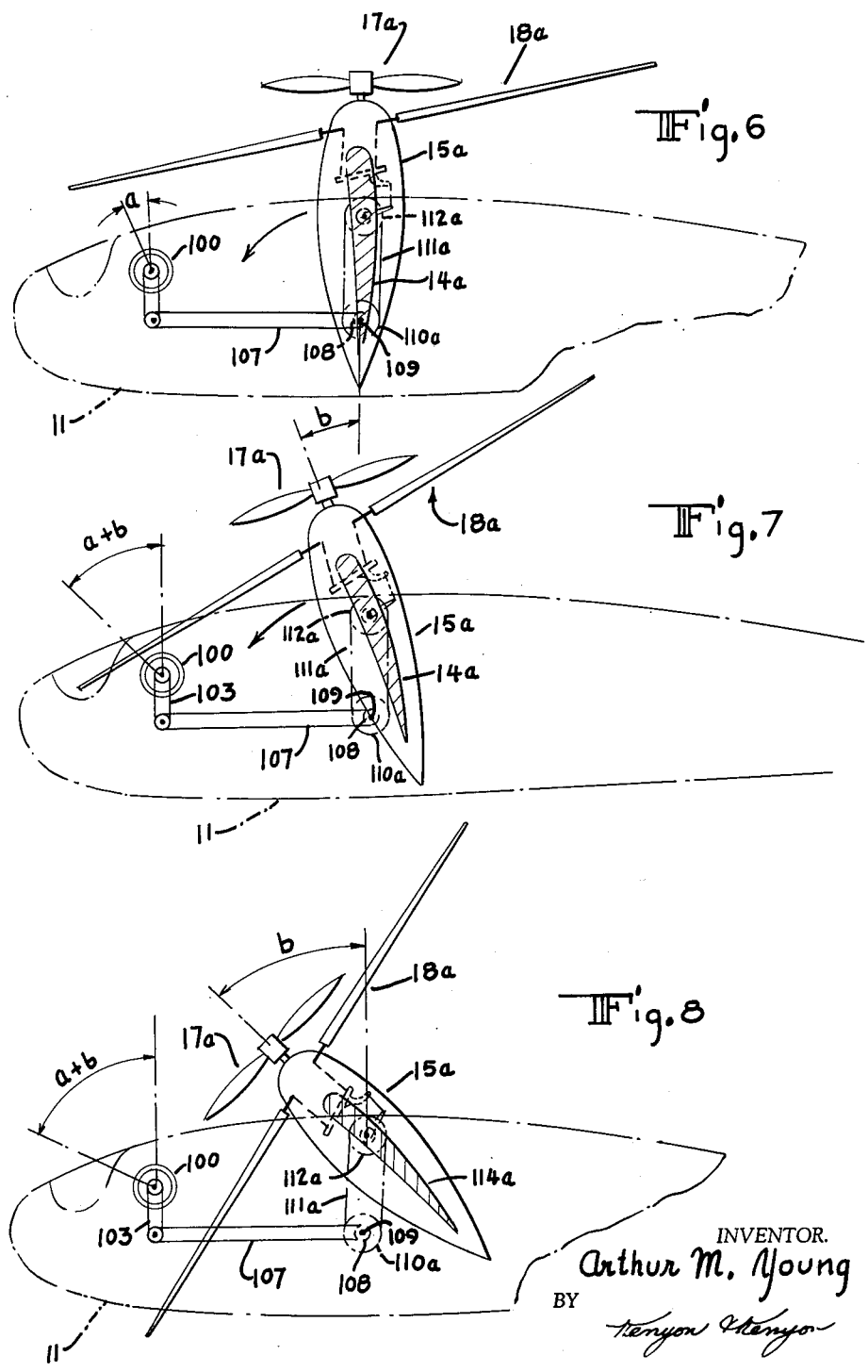

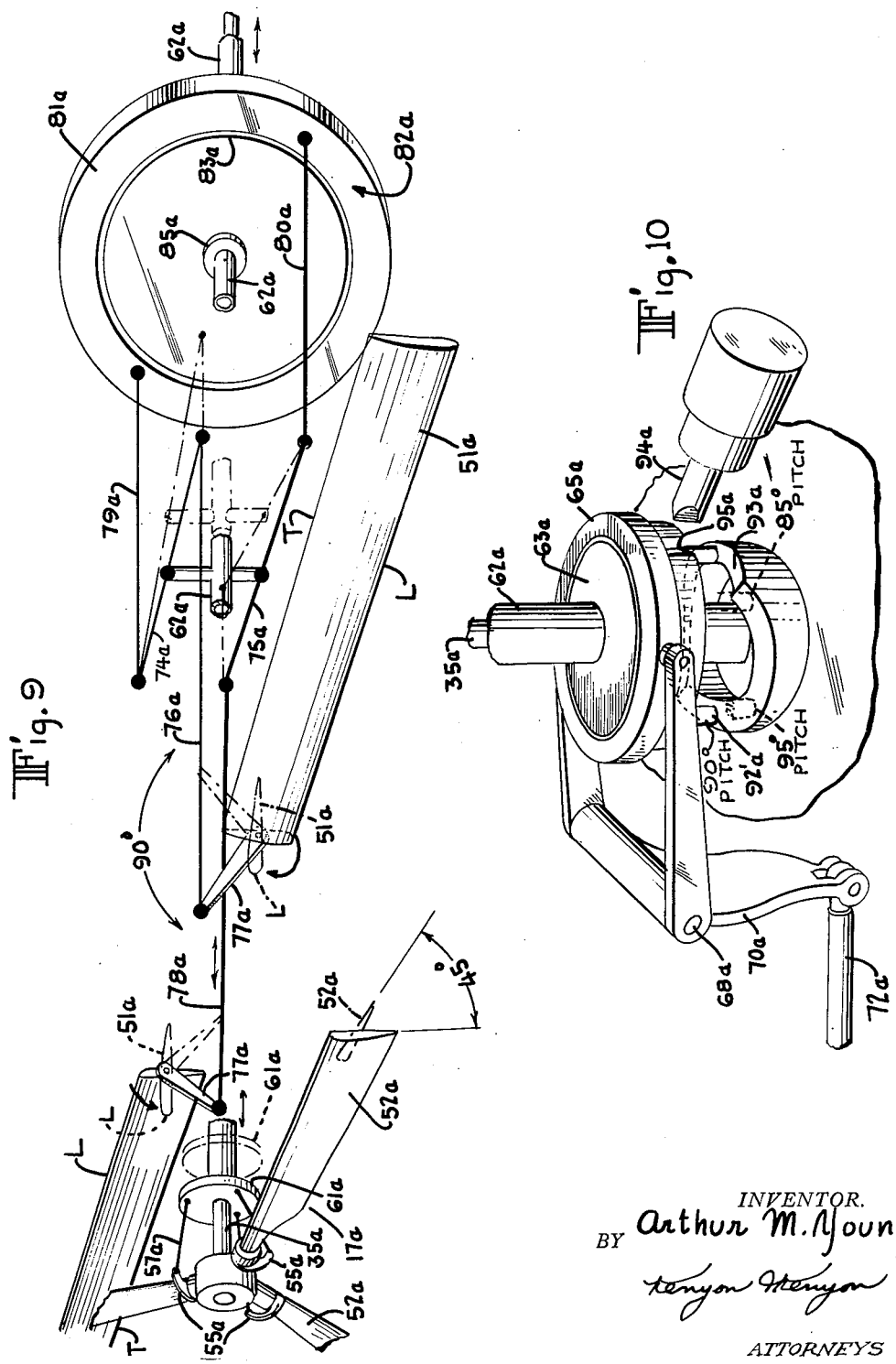

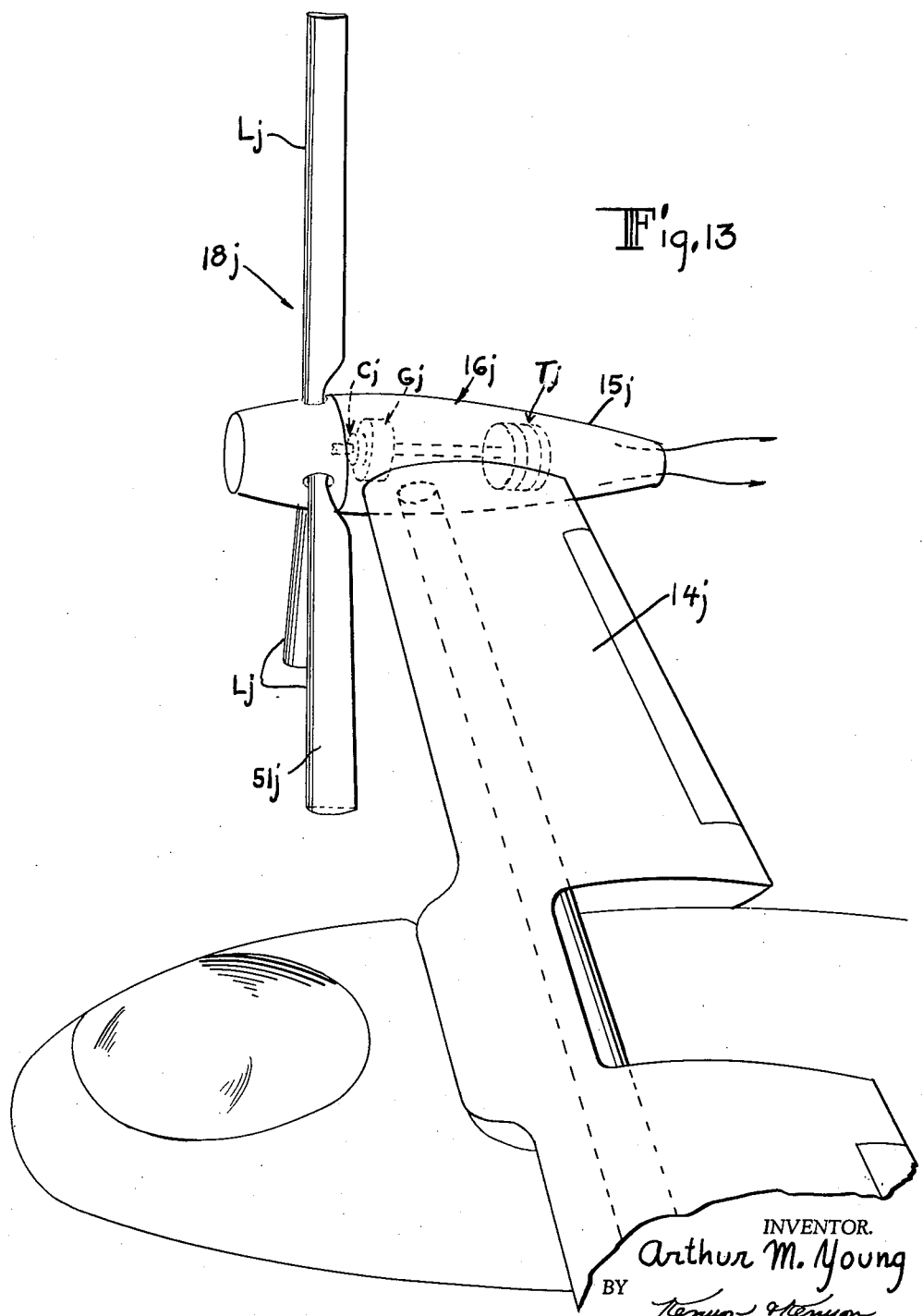

United States Patent Office 3,035,789
Patented May 22, 1962

3,035,789
CONVERTIPLANE
Arthur M. Young, Paoli, Pa.
Filed Nov. 27, 1957, Ser. No. 699,240
25 Claims. (Cl. 244—7)

The present invention relates to aircraft and more particularly it relates to such an aircraft that may be conveniently designated as a convertiplane, that is, one which will be able to take off, fly and land as a helicopter and also be capable after having risen to a sufficient height of being readily convertible into an airplane for forward flight at high speed. In other words, the convertiplane contemplated by this invention is an aircraft intended to take off substantially vertically as a helicopter and thereafter, through a flight regime, to be convertible to horizontal forward flight as an airplane.

In earlier structures intended to operate in such manner, a rotor or rotors intended to provide lift in the helicopter phase and also to provide thrust in the airplane phase have been suggested. In order, however, for such rotor or rotors to accomplish both functions, compromises in structure have been necessary. Such rotors must be of large diameter compared to the span of an airplane wing for economical take off. However, the use of such rotor or rotors for propulsion of a plane as an airplane propeller are found extremely inefficient.

An airplane wing, or a propeller or a helicopter rotor may be thought of as an aerodynamic lever. Through this lever a small imput force is multiplied at the output into a larger force, at the expense of operating through a greater distance or, what amounts to the same thing, at the expenditure of greater velocity. Thus—

Small imput force at large velocity produces large output force at small velocity.

In an airplane the propeller thrust, exerted at the velocity of the airplane draws the wing, from which is obtained a large force (the airplane weight) at a low velocity (the rate of descent of the plane in a glide). Similarly in a helicopter rotor, the engine torque drives the rotor at high velocity to produce lift which operates at a relatively low velocity measured by the slipstream velocity of the rotor.

It will be evident, therefore, that a convertiplane rotor in its helicopter phase is called upon to exert a large force at a low velocity, and if the same rotor is used as a propeller, then in its airplane propeller phase, it is called upon to exert a small force at a high velocity. Theoretically, a change in rotor diameter during flight would make it possible to satisfy these conditions. However, this would involve constructional difficulties. Other than this, the only way to vary the rotor thrust is to vary the angle of the wind on the blades or in technical parlance, by varying the operating coefficient of lift $C_L$ of the blade. This adjustment provides a moderate amount of change. However, the amount of this change is inadequate for operating requirements and unfortunately for the convertiplane, good practice in helicopter usage requires that the $C_L$ used in flight as a helicopter be at the low end of the available range in order that in helicopter flight blade stall may be avoided. Since it is also the low end of he coefficient of lift range that is required when the rotor is functioning as an airplane propeller, it can be seen that the coefficient of lift range for convertiplane use is still further restricted. Further difficulties encountered are in the fact that despite the small drag coefficient or drag component of the blade elements in the airplane phase, the torque component becomes increasingly large as the forward speed and hence the necessary pitch setting is increased.

Objects and features of the present invention are the provision of a convertiplane construction in which the difficulties hereinabove outlined are overcome. In overcoming these difficulties, the present invention contemplates providing a wing structure that is freely pivoted relative to the fuselage together with two sets of rotary wing carried elements, one of each set comprising a rotor and the other of each set a propeller. The rotary elements are carried in separate nascelles located at spaced apart points of the wing structure, the rotors functioning for helicopter lift and the propellers functioning for thrust in the airplane phase. In conjunction with these elements, collective and cyclic pitch changing controls and clutches suitably coordinated to meet the power requirements for both phases are provided.

In the helicopter phase, the power from the engine is directed into the large rotors. In the airplane phase, the power is directed into the propellers, with the large rotors declutched. Both the large rotor and the propeller of each set are mounted coaxially and intended to be driven by the same engine. In the helicopter phase, the common axis of each of the rotor and the propeller sets is substantially vertical. In the airplane phase, this axis is shifted into substantially horizontal position.

In the prior art the suggestion of the use of two rotors appears notably in a so-called MacDonnell machine and a still earlier Herrick machine. In both of these proposals, however, the axis of the lifting rotor which is, of course, vertical at take off, remains so during flight of the device as an airplane. In consequence, at high forward speed of the machine, the blades on one side of the lift rotor are advancing and on the other side are retreating. This is the condition that the usual helicopter and autogiro have to cope with which limits their forward speed. In order to exceed the horizontal speed possible solely as helicopters, previous devices provide additional thrust through an airplane propeller and additional lift through a wing. The rotor is thus spared the necessity of providing a lifting and forward thrust. But, unfortunately, the rotor is still there during forward horizontal motion. If it is kept in rotation during such horizontal forward motion, the difference in lift on the advancing and the retreating blades is so great that it is necessary to avoid all lift from the rotor. If, however, the rotor is stopped, the retreating blade will be going backwards through the air which involves difficulties that even if met for the stopped rotor, are still great during the time that the rotor is slowing down; when part of the retreating blade is going forward and part going backward.

The present invention departs from the above concepts by tilting the lift rotor forwardly until at high forward speed of the craft as an airplane, it is moving axially, the incoming air then meeting both of its blades symmetrically. In this position, the rotor can be slowed down without difference of lift on its two sides, all blades meeting the air symmetrically and when the rotor comes to rest all blades are meeting the air leading edge first. So disposed, the rotor blades may, if desired, continue to provide lift for the craft and as will be apaprent from the structure to be described, can provide a control whose regime from zero to maximum forward speed undergoes no discontinuity.

Other objects and features of the invention are the provision of an arrangement permitting coordinated control of all variable or adjustable position elements from a common control position in the aircraft.

Other objects and features of the invention are the provision of free wheeling means in each rotor-propeller shaft drive and of interconnecting means between shafts ahead of the free wheeling means so that engine failure of one of the two engine drivers will permit the other to continue drive of shafts of the rotors and propellers as required in all sets and also permit synchronized rotational speeds for rotors and propellers of the sets.

Further features of the invention include the provision of two engines in the wing structure at spaced apart points from the fuselage thus reducing likelihood of complete power failure, providing less noise at the passenger compartment because of remoteness of transmission and engine exhaust therefrom and providing good load distribution, the concentrated engine weights being right at the rotor-propeller set positions, thereby reducing vibration and required structural weight.

Further features include the location of the rotors sufficiently high above the ground so that they may be tipped back of perpendicular or flared for autorotation landings, without inclining the fuselage and without necessitating that the pilot "spill the flare" fast before ground contact. This feature is of importance for it permits the use of rotors with high power loading (and hence high rates of descent in autorotation) which otherwise could not be used due to the reduced time and hence increased skill the pilot would have to exercise to "flare-spill flare-and-make ground contact." In the arrangement of this invention, moreover, autorotation landings may be made even with a 45° flare, and the flare maintained right up to and during ground contact.

Further objects and features of the invention are the provision of freely pivoted wing structure carried by the fuselage. Since the wing structure pivots and in vertical take off lies substantially vertical, no blocking of rotor slipstream occurs to reduce lift when the aircraft flies as a helicopter. Moreover, my experimental work has shown that the pivoted wing structure offers little resistance to forward motion in its helicopter position because it is actually not inclined with respect to the rotor slipstream. Moreover, due to the strong downwdraft from the rotors, the wing structure is capable of producing lift at steep wing angles and low speeds.

Further objects and features of the invention are the provision of means for declutching the rotors when forward speed of the craft has been established and engaging the propellers to provide the entire thrust load of the aircraft.

In another aspect of the invention, it contemplates the use of jet engines to provide entire thrust in forward flight, and use of rotors for helicopter flight in conjunction with freely pivoted wing structure as hereinbefore mentioned.

Other objects and features of the invention will become apparent from the following description and the accompanying drawings wherein:

FIGURES 6, 7 and 8 illustrate diagrammatically successive positions of the wing structure and one of the rotor and propeller sets during transition of the aircraft from helicopter flight to horizontal forward airplane flight;

FIGURE 9 is a perspective diagrammatic view of collective and cyclic controls for a propeller and for its associated rotor;

FIGURE 10 is a fragmentary perspective view of details of a locking mechanism for one of the rotors;

Figure 12:
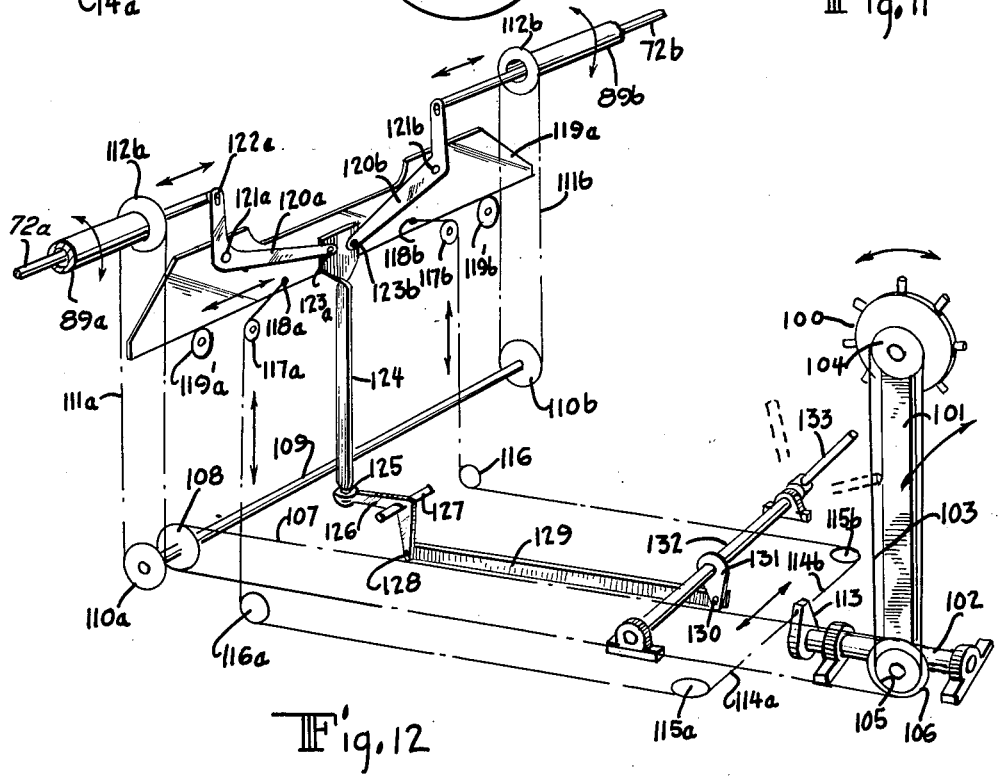

FIGURE 12 is a diagrammatic and perspective showing of various rotor and propeller controls in relationship to the common location, for example, at the pilot's seat in the cockpit; and FIGURE 13 is a fragmentary perspective view of a modified construction utilizing jet engine means for forward propulsion as an airplane with one of the multi-blade rotors shown in its required position for horizontal flight of the aircraft.

Figure 1:
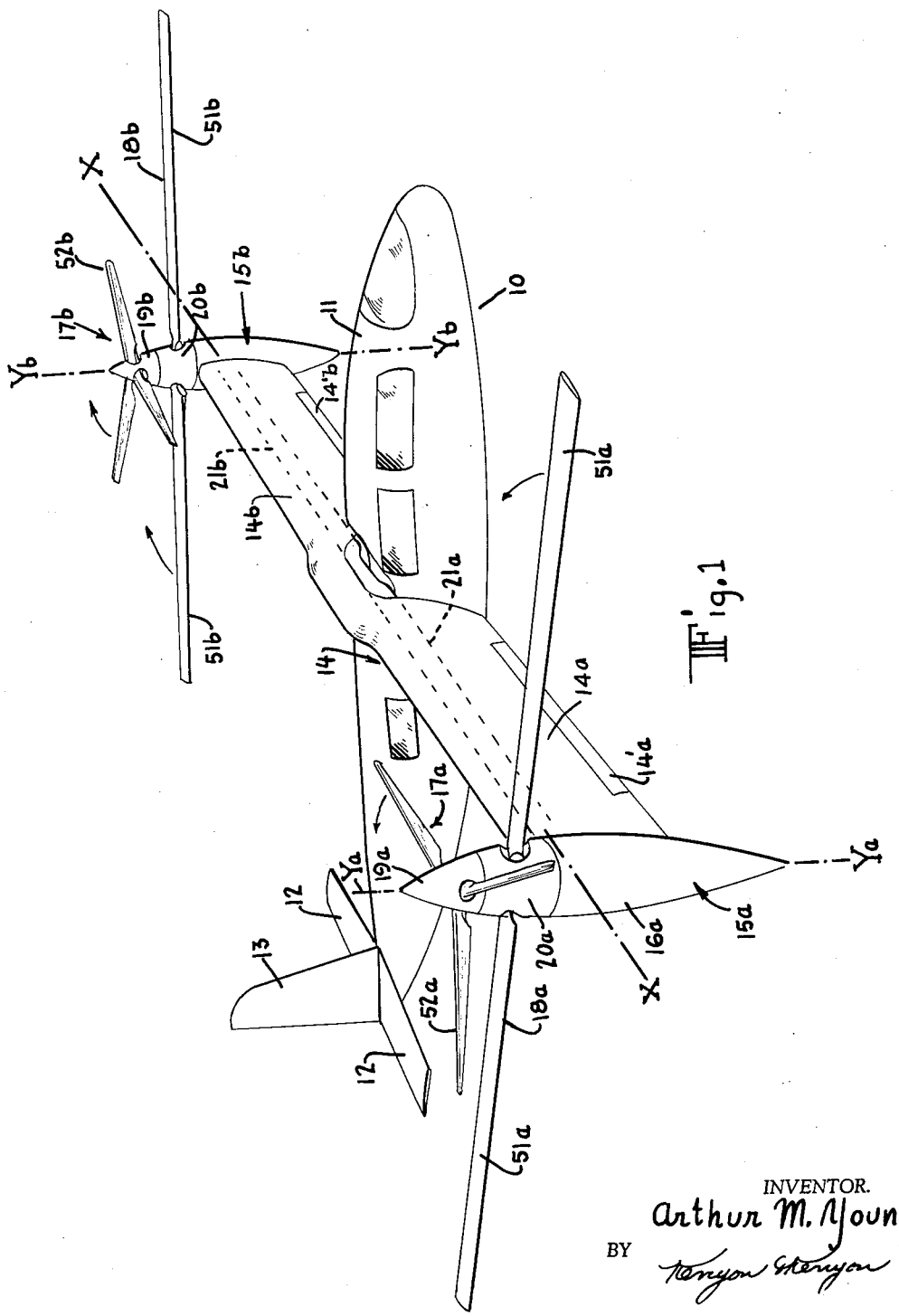
FIGURE 1 is a perspective view of the aircraft or convertiplane shown in initial vertical take off as a helicopter.

Referring to the drawings and first to FIGURE 1, the reference character 10 denotes generally an aircraft or convertiplane embodying this invention. This aircraft 10 includes a conventional fuselage 11 constructed to conform to the requirements of minimum drag in forward flight. In the embodiment shown, the fuselage 11 has conventional rear elevators or tail construction 12 and a rudder 13. These components in some instances, as will be described hereinafter, may not be required.

A wing structure 14 comprising wings 14a and 14b extending symmetrically from opposite sides of the fuselage 11 is arranged thereon, preferably being an integral unit which is supported pivotally relative to the fuselage 11 for rotation on an axis X—X which is transversely disposed relative to the fore and aft fuselage direction in a manner to be presently described. The wings 14a and 14b have conventional and required wing section for airplane type of flight and are equipped with conventional ailerons 14'a and 14'b that are adapted to be operated by the pilot from the cockpit by conventional controls (not shown). Nascelles 15a and 15b are located respectively at symmetrically spaced apart points of the wings. In the embodiment shown they are at the outer extremities of the wings 14a and 14b. Preferably these nascelles 15a and 15b have conventional streamlined external contour. These nascelles 15a and 15b contain respectively the engines such as engine 16a (FIG. 2) of the aircraft.

Propellers 17a and 17b each of the feathering multi-blade type and, also, helicopter type, two bladed feathering rotors 18a and 18b are associated with the respective nascelles 15a and 15b the rotor 18a and propeller 17a constituting a coaxial rotor-propeller set and rotor 18b and propeller 17b constituting a second coaxial rotor-propeller set are adapted respectively to rotate about common axes $Y_a$—$Y_a$ and $Y_b$—$Y_b$ so that an engine in the respective nascelle 15a or 15b, as the case may be, serves ordinarily to drive the particular propeller rotor set 17a, 18a or 17b, 18b associated with it. The spinners 19a, 19b and 20a, 20b rotate with their respective propellers and rotors relative to their associated nascelles 15a and 15b. By way of example, a propeller diameter ⅓ the diameter of the rotor diameter may be selected being intended to operate at three times the shaft speed of the rotor.

The respective wings 14a and 14b are mounted on freely rotatable coaxial shafts 21a and 21b (FIGURE 2) which extend laterally from opposite sides of fuselage 11 being supported respectively by bearings appropriately, carried by the framework (not shown) of the fuselage 11. The common axis X—X of the two aligned shafts 21a and 21b constitutes a free pivoting axis of the wing structure 14 as a unit relative to the fuselage 11. This pivoting axis X—X is so disposed with respect to the wings 14a and 14b as to coincide with the line representing the center of pressure of the wing structure as a totality (wings, nascelles, rotors and propellers). Moreover, the center of gravity of the combined wing, nascelle, engine, propeller-rotor structure as a totality should also be close to said pivoting axis. The first condition is required to prevent lift on the wing structure from causing a rotational moment on the wing structure about its free pivoting axis X—X. The second condition minimizes the required control for orientation of the wing structure as a totality with respect to the fuselage 11.

Intentionally, no force producing mechanism other than the rotors 18a and 18b and the ailerons 14′a and 14′b are provided to pivot the wing structure as a totality with respect to the fuselage 11 about said pivoting axis X—X. Experiments show that rotor blade pitch control through a swash plate, as will be presently described, is quite adequate for this purpose and has the added advantage of causing no torque reaction on the fuselage 11 which, being free in space, is incapable of resisting couples without additional structural provisions.

*Nascelles*

Since each of the respective nascelles 15a and 15b has identical construction and includes identical components, one only, namely, nascelles 15a is shown in detail in FIGURES 3, 4 and 5 and is further described in detail below, it being understood, however, that corresponding components of identical type and arrangement are found in nascelle 15b. A subscript b to any reference character in the drawing indicates an identical component with a similar reference character having a subscript a.

Figure 2:
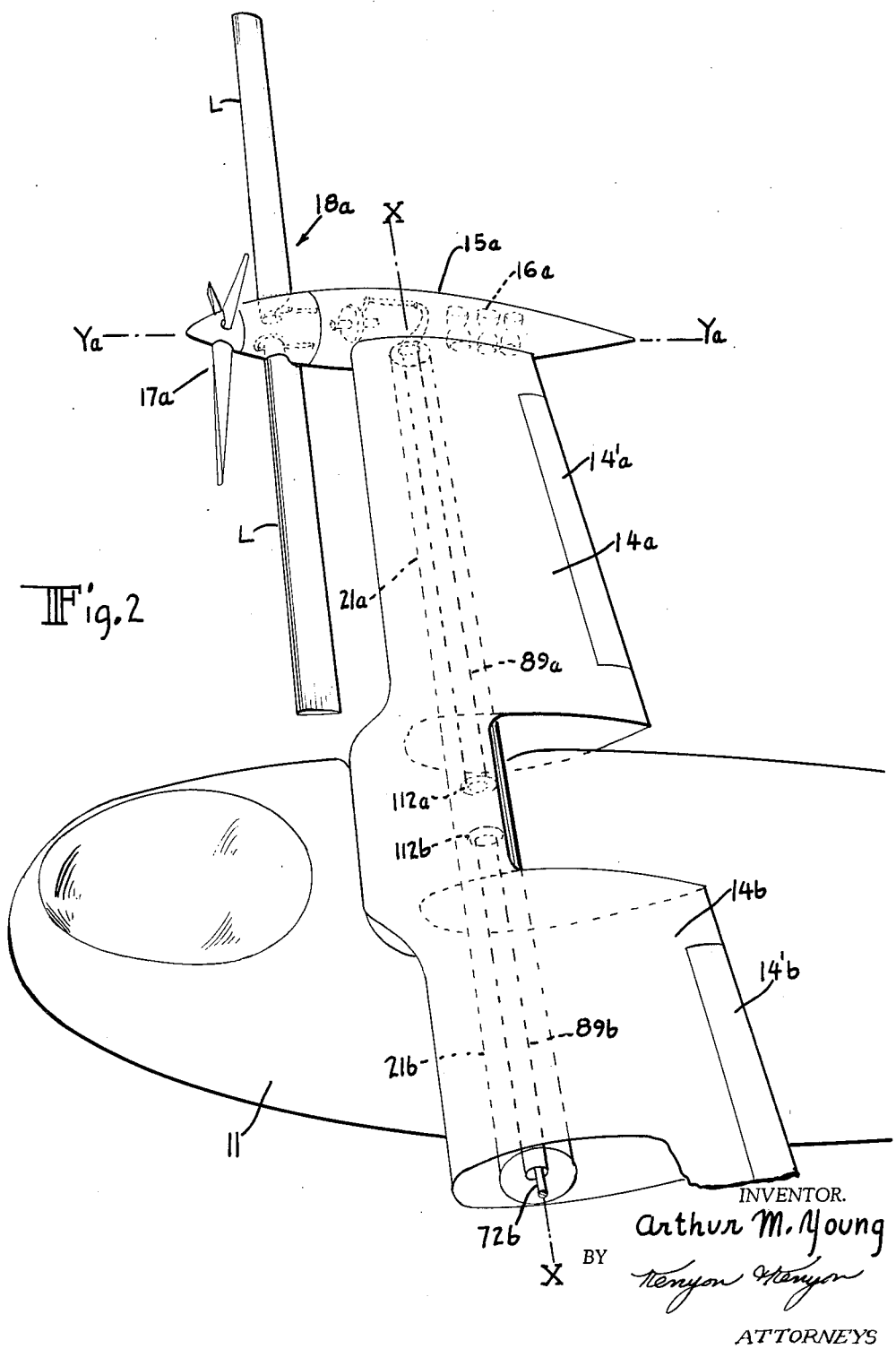
FIGURE 2 is a fragmentary perspective view of the aircraft shown in forward horizontal flight as a conventional airplane.
Figure 3:
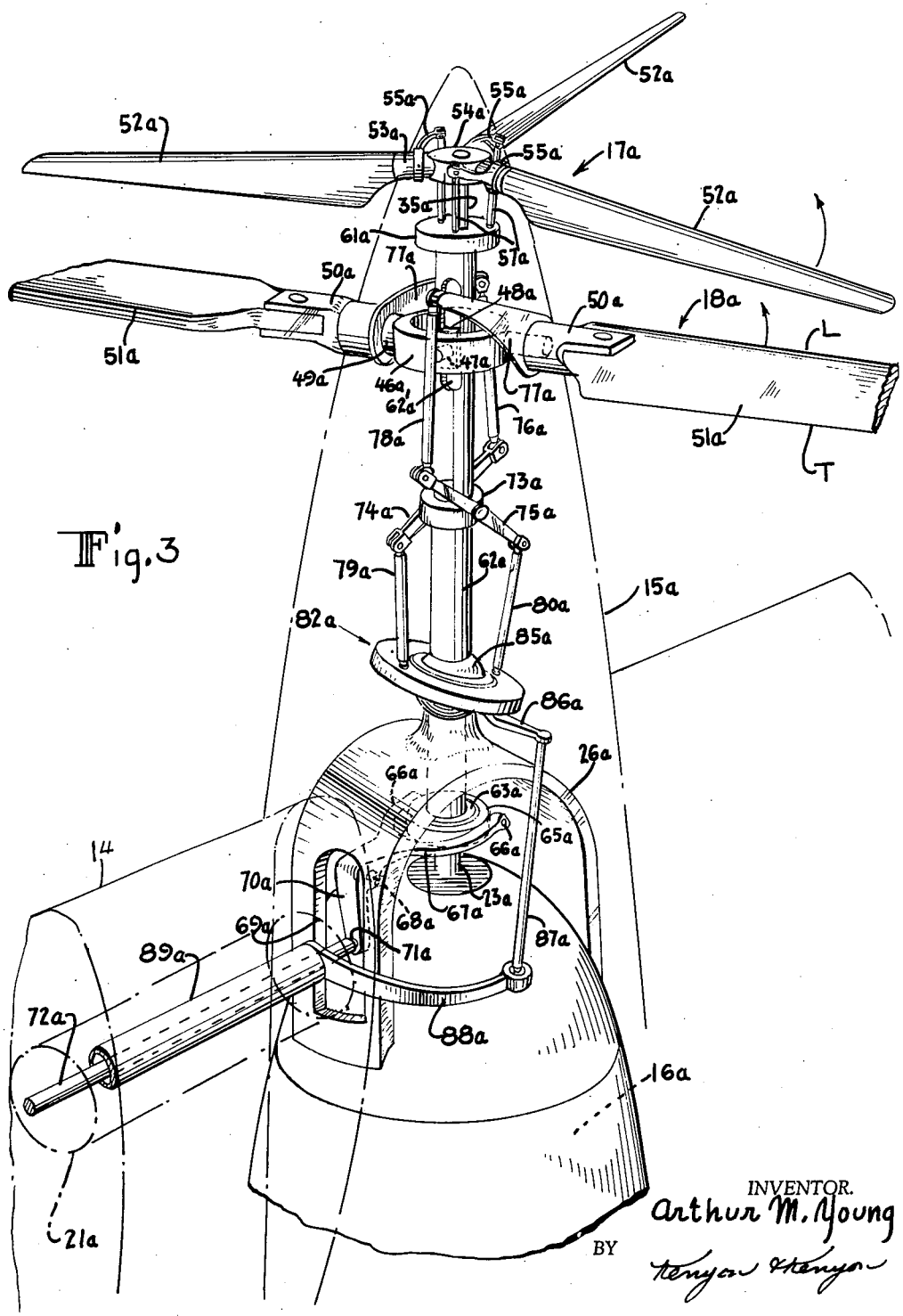
FIGURE 3 is a fragmentary perspective view, partially broken away, of the forward portion of one of the nascelles illustrating mechanisms required for the control of the propeller and rotor set associated with the nascelle in relationship to their common driving engine.
Figure 4:
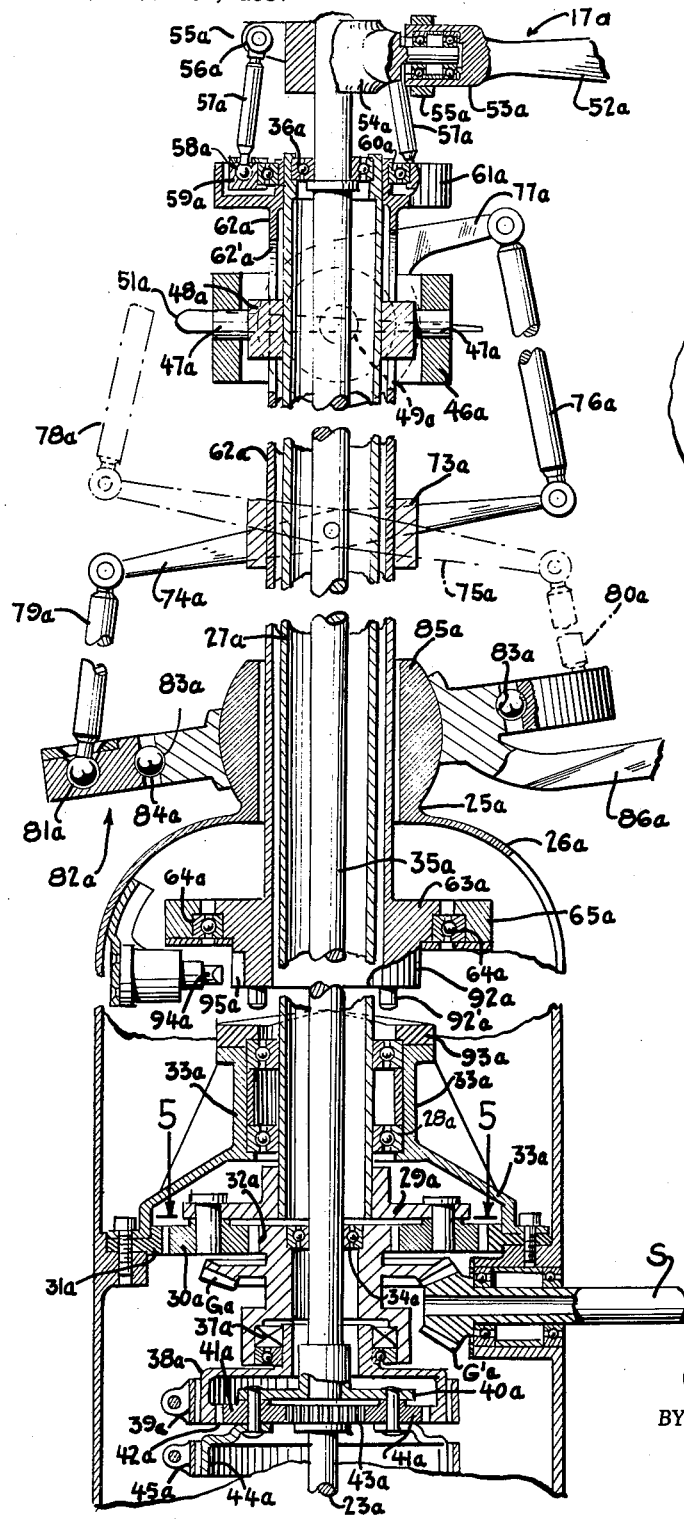
FIGURE 4 is a longitudinal sectional view of the rotating and operating controls in the same portion of the nascelle of FIGURE 3.
Figure 5:
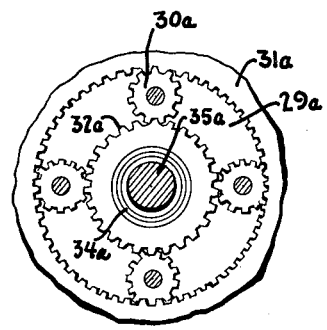
FIGURE 5 is a section taken along the line 5—5 of FIGURE 4 viewed in the direction of the arrows.

Referring now to FIGURES 2, 3 and 4, the nascelle 15a includes an engine 16a. This engine is located and supported in the nascelle in such position that the center of gravity requirements of the wing structure as a totality hereinabove mentioned, are met. This engine has a forwardly projecting drive shaft 23a.

A mast 26a (FIGURES 3 and 4) is attached rigidly to the framework (not shown) of the nascelle 15a in advance of the engine 16a and lies in the axial alignment with the said drive shaft 23a. The mast is supported, for example, by brackets or bulkhead 26a secured to said framework. A tubular shaft 27a extends through the mast 26a being free to rotate therein. The shaft 27a is supported as by the ball bearings 28a and terminates inwardly in a spider 29a carrying the planetary gears 30a. These planetary gears 30a mesh both with an external ring gear 31a and a spur sun gear 32a. The ring gear 31a is fixed and housed in an appropriate bracket 33a. The sun or spur gear 32a is rotatably supported by bearings 34a on an axially directed shaft 35a which projects outwardly of both ends of the tubular rotary shaft 27a. Bearings 36a between shafts 27a and 35a provide spacing and support and also permit free relative rotation between the two shafts. The gear 32a is connected through a conventional free wheeling device 37a to a brakedrum 38a surrounded by a brakeband or clutch 39a.

The inner end of the shaft 35a has a spider 40a secured to it. This spider carries planetary gears 41a that mesh respectively with a ring gear 42a on drum 38a and with a spur gear 43a. The sun or spur gear 43a is secured for rotation with the engine drive shaft 23a. A breakdrum 44a is secured to the second spider 40a. A brakeband 45a surrounds drum 44a. The two brakebands 39a and 45a are controlled conventionally from the cockpit. The respective sets of bands and drums function as clutch mechanism and may be replaced by other types of clutches. At the outset the engine is started with both bands released. The band 45a is tightened. Then the powered rotation of the engine shaft 23a will rotate the ring gear 42a and rotate the sun gear 32a through the free wheeling device 37a. In consequence, because ring gear 31a is fixed, the planetary gears 30a will rotate spider 29a and in consequence, the shaft 27a. The rotor 18a then will rotate with shaft 27a.

To rotate the propeller 17a for airplane flight, shaft 35a must be driven. To this end brakeband 45a is released and band 39a tightened. This locks ring gear 42a and causes spider 40a which is secured to shaft 35a, to rotate and drive the latter. The rotor shaft 27a now free wheels until brought to a stop as will be described. The relative speeds of rotation of the shaft 35a and 27a are selected as desired and may, for example, be in the ratio of 3 to 1, i.e. 900 r.p.m. for the shaft 35a to 300 r.p.m. for shaft 27a, depending upon the gear ratios selected for the gear trains just described.

The spur or sun gear 31a is, in addition, mechanically connected ahead of the free wheeling device 37a to a bevel gear Ga which meshes with a mating bevel gear G′a connected to a shaft S which extends through the wind structure 14 and at its opposite end is connected or coupled with gear components corresponding to those just described which are located in the nascelle 15b. Thus failure of one of the two engines borne by the respective nascelles still will permit the still running one of these two engines to supply motive power to the required shafts in both nascelles. The shaft S also provides means for synchronizing the speeds of rotation of the required shafts in both nascelles.

The rotor 18a and its spinner 20a which are intended to be rotated by the tubular shaft 27a, are positioned near its outward end. The rotor 18a is of known two blade type being supported from the tubular driving shaft 27a by a semi-rigid universal joint arrangement, for example, that described in Patent 2,384,516. The rotor includes a hub consisting of an outer ring 46a which is supported pivotally on pins 47a projecting from an inner member 48a. This inner member 48a is secured for rotation with the tubular shaft 27a.

Diametrically disposed pins 49a (FIGURE 3) projecting radially from the outer ring 46a at 90° positions relative to the pins 47a, serve as supports for rotor blade grips 50a. Ball bearings (not shown) provide for free axial rotation of the blade grips 50a on the pins 49a. Rotor blades 51a are secured to the blade grips 50a.

The propeller 17a which is of conventional multi-blade type and its spinner 19a are positioned substantially at the outer end of the drive shaft 35a. The propeller 17a is of any conventional feathering type and has a plurality (in this instance 3) of blades 52a which are rotatably supported in individual blade holders 53a. The holders 53a are carried by a hub 54a which is secured to the shaft 35a. These blade holders 53a are individually rotatable axially in conventional manner for blade feathering action about radially directed axes which extend outwardly at equi-spaced points from the hub 54a.

The propeller blades 52a are featherable by axial rotation of their holders. To this end cranks 55a extend laterally from the respective blade holders 53a. These cranks 55a are coupled respectively through ball and socket joints 56a (FIGURE 4) to links 57a. The links 57a in turn are coupled through ball and socket joints 58a to the outer, freely rotatable race ring 59a of a ball bearing member 60a. The member 60a in turn is supported in a socket-like end 61a of a longitudinally or axially slidable collective pitch control tube 62a. This pitch control tube 62a is concentrically mounted about the tubular shaft 27a and is movable longitudinally relative thereto. Slots 62′a in its wall through which the hub member 48a projects, permit axial movement of the tube 62a. The latter extends through the axial opening in the mast 25a and terminates inwardly in a lateral annular flange 63a which is connected by a ball bearing 64a with a race ring 65a. The ball bearing 64a provides free rotation between the ring 65a and flange 63a.

The ring 65a, as shown in FIGURE 3, is pivotally connected to the tines 66a of a forked arm of a bell crank lever 67a. the lever 67a is pivotally mounted at 68a to the bulkhead 26a within a slot 69a provided in the latter. The other arm 70a of the bell crank lever 67a is connected through a ball and socket joint at 71a to a longitudinally movable rod 72a which lies preferably concentric with and within the shaft 21a of wing 14a to which the nascelle 15a is attached. The rod 72a is intended to be moved longitudinally in either direction from the cockpit, as will be hereinafter described, to provide feathering or collective pitch control movement of the control tube 62a.

This axial movement of the collective control tube 62a is intended also to provide collective pitch control for the rotor blades. To this end, a ring member 73a is secured to the collective pitch tube 62a, below the rotor hub. A pair of levers 74a and 75a are pivotally supported at their respective centers in scissor-like fashion from the ring 73a at diagrammatically opposite sides of the latter. One arm of the lever 74a is coupled through a ball and socket joint connection to a link 76a whose other end, through a ball and socket connection, is connected to a crank 77a secured to one of the rotor blade grips 50a. Similarly, one arm of the lever 75a is coupled through a ball and socket joint connection to a link 78a whose other end, also through a ball and socket joint connection, is coupled to the crank 77a of the other rotor blade grip 50a. The other ends of the two levers 74a and 75a are connected through ball and socket joints respectively to links 79a and 80a whose other ends are connected by ball and socket joints to the rotatable outer race 81a of a swash plate 82a. The inner race 83a of the swash plate 82a is coupled to the outer race 81a by the ball bearings 84a. The inner race ring 83a is freely tiltable in a fore and aft direction on the spherical portion 85a of the mast 26a. The outer race 81a tilts with it.

The two levers 74a and 75a are in crossed or scissor-like arrangement relative to each other as appears from FIGURES 3 and 4 so that longitudinal movements of the links 76a and 78a usually are in opposite directions when the swash plate is tilted on its spherical support 85a. Also, as the ring 73a is secured to the collective pitch tube 62a, longitudinal movement of the latter causes corresponding longitudinal movement of the common pivoting axis of the two scissor levers 74a and 75a irrespective of any tilting movement of the swash plate. In consequence, the longitudinal movement of the collective pitch control tube 62a provides a pitch control for the rotor blades 51a which may impart collective pitch changes from zero to 90° to the rotor blades 50a. Simultaneously, the linkages 57a serve on longitudinal movement of collective pitch control tube 62a to provide collective feathering pitch change from zero to 45° to the propeller blades 52a.

The swash plate 82a is tiltable on its spherical support 85a in a fore and aft plane. Controls are provided for tilting it. To this end a crank 86a is secured to the inner race 83a of the swash plate 82a. This crank in turn is coupled through a link 87a (FIGURE 3) with ball and socket connections at each end to a crank 88a secured to a rotatable sleeve 89a which surrounds the shaft 72a within wing shaft 21a. Rotation of the sleeve 89a in clockwise or counterclockwise direction from the pilot's cockpit thus serves to tilt the plane of the swash plate about the fore and aft axis of the fuselage. This tilting of the swash plate plane is transmitted by the links 79a, 80a, the levers 74a, 75a and links 76a, 78a to the respective cranks 77a of the rotor blade mounts 50a in such a manner as to tip the plane of rotation of the rotor blades 51a fore or aft as desired thus providing a cyclic pitch control of the rotor blades 51a.

One of the requirements regarding the rotors 18a and 18b is that they be stopped and locked in non-rotative position when the aircraft is to operate in horizontal forward flight, i.e. the position shown in FIGURE 2 at which time engine power should be delivered only to the propellers 17a and 17b. To this end, provision is made for unlocking and locking the tubular rotor driving shaft 27a.

To this end, an extension 92a having axially directed pins 92'a (FIGURES 4 and 10) is provided on the flange 63a at the foot of the collective pitch tube 62a. The extension and pins are movable reciprocally with the control tube 62a toward and away from a stationary double peaked cam surface 93a which is fixed at the upper end of bracket 33a. The pins 92'a are adapted to slide over the double peak like cam 93a. When the pins ride on the lowest portions of the cam surface 93a, the collective pitch tube 62a is moved axially sufficiently to bring the rotor blade pitch to a value slightly beyond the desired 90° position of horizontal flight, i.e. about 95° and to impart a slight negative pitch to the rotor blades 51a as they approach their aileron position. This slight negative pitch will cause the rotor 18a to stop and then rotate backwards until it comes back to the point where the pins 92'a ride into engagement with the cam peaks thus thrusting the collective control tube 62a upwardly as seen in FIGURE 10 to return the rotor blades to about an 85° pitch again reversing rotation of the rotor blades until they come to rest at a 90° pitch (which is zero degrees to the oncoming wind) where the rotor 18a would then tend to stay. The pins 92'a then rest on a portion of the cam surface intermediate its peak levels and lowermost levels. At that instant, a locking pin 94a is operated to engage a slot 95a provided in the extension 92a. This pin is operated in any convenient way and serves to lock the rotor 18a in its aileron position. Thus, in effect, a negative feathering action on the rotor blades 51a just as they are arriving at the aileron position is utilized to bring the rotor to rest and facilitate its being placed into and then locked in the aileron position by a locking pin 94a. It is understood, of course, that the operation of the pin 94a would be effected only after the brake band 45a has been released so as to eliminate transmission of power of the engine shaft 23a to the rotor shaft 27a. It is understood further that other locking arrangements for the rotor 18a in aileron position may be provided.

*Controls*

Figure 11:
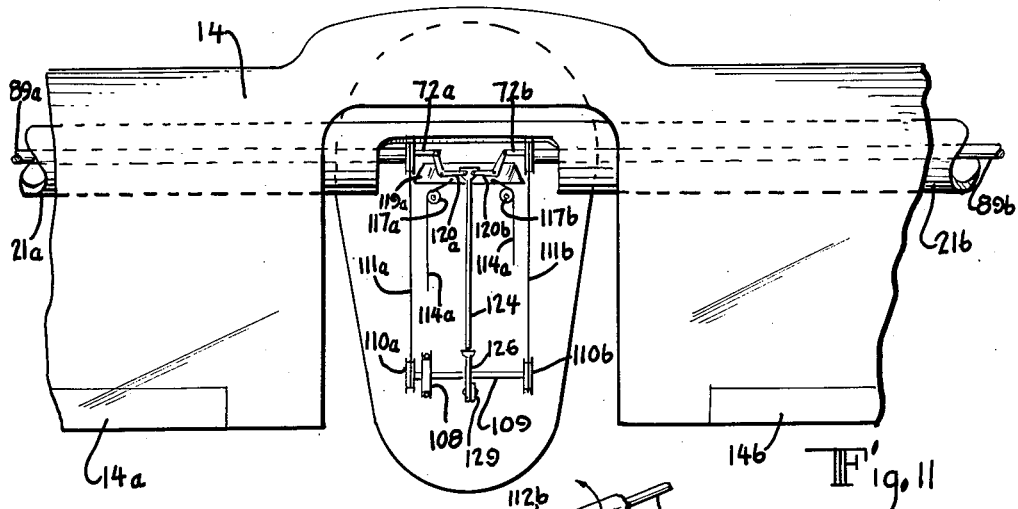
FIGURE 11 is a fragmentary partially broken away and transverse sectional view of the fuselage, illustrating a manner of control of the rotors and propellers from a common location in the cockpit of the aircraft.

As hereinabove pointed out, the propeller and rotor set of each nascelle is provided with a collective control to provide collective pitch control or feathering from zero to 45° of the propeller blades and from zero to 90° of the rotor blades. In addition, the rotor blades are provided with a cyclic pitch control arrangement including a swash plate so that the plane of the rotor blades may be tilted fore or aft as well as having their pitch controlled as necessitated by such rotor plane tilts. It is intended that the controls just mentioned in each nascelle be operable simultaneously and correspondingly from the cockpit. Such arrangement is illustrated diagrammatically in FIGURES 11 and 12.

Swash plate control for both rotors in fore and aft direction is effected at the cockpit by the hand wheel 100 which is rotatably mounted at the end of a control stick 101. The control stick 101 is supported pivotally by a shaft 102 and the axis of rotation of the hand wheel 100 is at right angles to the axis of rotation of stick 101 about axis of shaft 102. A cable 103 is threaded around a sheave 104 which is rotatable by the hand wheel and around a second sheave 105 adjacent the lower end of control stick 101. A second pulley or sheave 106 is mounted coaxially with the sheave 105 and is intended to rotate together therewith. The sheave 106 is connected by an endless rope, cable, or band 107 with a sheave 108 mounted on a shaft 109 which is rotatively supported in the fuselage 11. Sheaves 110a and 110b secured respectively to the shaft 109 are connected by the respective endless bands or cables 111a, 111b to sheaves 112a, 112b which are secured to the respective tubular shafts 89a, 89b. The shaft 89a as hereinbefore described and shown in FIGURE 3 is coupled through crank 88a, link 87a and crank 86a to swash plate 82a. Corresponding connections between shaft 89b and the swash plate of rotor 18b are provided. Thus rotation of the hand wheel 100 in either direction provides simultaneous like swash plate tilts in fore and aft directions as desired.

The shaft 102 of the control stick 101 is provided with a crank arm 113 to opposite sides of which respective cables 114a, 114b are secured. These cables 114a, 114b in turn pass respectively around sheaves 115a, 115b, 116a, 116b, 117a and 117b and are secured at points 118a, 118b of a transversely disposed bar 119a which is rollable sideways over guide rollers 119'a, 119'b in response to a swing of the control stick to right or left about the axis of shaft 102. The plate 119a carries a pair of oppositely disposed and like cranks 120a, 120b which are pivoted respectively at 121a, 121b to the plate 119a. An arm of each of the cranks is secured by pin and slot arrangements respectively at 122a and 122b to the respective longitudinally movable operating shafts 72a, 72b which, as hereinbefore described, serve to manipulate or operate the longitudinally movable collective pitch control tube 62a or its counterpart (not shown) in the nascelle 15b. The other arms of the bell crank levers 120a, 120b are pivotally secured at 123a, 123b to the link 124. This link 124 is vertically movable and has its other end pivotally secured at 125 to one arm of a bell crank lever 126 pivotally supported on a transverse supported shaft 127, secured in any suitable manner in the fuselage. The other arm of the bell crank 126 is secured pivotally at 128 to a connecting link 129 whose other end is pivoted at 130 to a crank 131. Crank 131 is carried by a transverse rotatable shaft 132 which is positioned in the fuselage near the cockpit of the craft and operable by a second control stick 133. Manipulation of the control stick 133 either forwardly or rearwardly causes corresponding rotation of the shaft 132 and consequently of crank 131. The rotation of the latter is transmitted by link 129, bell crank 126, link 124 and bell cranks 120a, 120b to cause simultaneous longitudinal displacement of the operating shafts 72a, 72b which effect reciprocal longitudinal movement of the respective collective pitch control tubes like tube 62a in respective nascelles 15a and 15b. Thus, it is apparent that simultaneous like control of all swash plates and pitch control tubes associated with the two nascelles can be effected by simple pilot manipulation of the hand wheel 100 and the control sticks 101 and 133 and other elements, if needed, all located in the cockpit. The manipulation of the control stick 133 provides simultaneous collective control of the tubes like 62a in both nascelles. The manipulation of the control stick 101 about its supporting shaft 102 on the other hand provides differential control of the respective collective control tubes like 62a and its counterpart in the two nascelles. The manipulation of the hand wheel 100 effects simultaneous cyclic control of the two swash plates 82a in nascelle 15a and its counterpart in nascelle 15b.

*Operation*

The convertible aircraft or convertiplane hereinabove described is adapted for vertical take off and for flight as a helicopter and may thereafter be converted into an airplane for high speed forward flight. In initial position on the ground the aircraft 10 has the wing disposition shown in FIGURE 1 in which the wing chords are substantially vertical so that the axes $Y_a$—$Y_a$ and $Y_b$—$Y_b$ of the nascelles 15a and 15b stand substantially vertical with both the propellers 17a and 17b and the rotors 18a and 18b uppermost, and with all the blades substantially horizontal. The engines in the respective nascelles 15a and 15b then serve to rotate the propellers and rotors about vertical axes. It is understood, of course, that the respective engines act to drive their coaxial shafts in opposite directions so that the propeller-rotor set of nascelle 15a rotates in opposite direction to the set of nascelle 15b.

In order to take off, the engines are gunned and all clutches, e.g. clutch 45a are activated to lock all spiders, e.g. spider 40a, causing simultaneous rotation by the two engines of corresponding rotor shafts, e.g. shaft 27a. The rotors then rotate at a selected value, for example 300 r.p.m. The pilot then operates the collective pitch control lever 133 to provide required feathering of the rotor blades 51a for vertical take off.

When vertical take off has been effected in this manner, and the aircraft has achieved a desired elevation, the pilot can, if he desires, continue to manipulate the craft as a helicopter for hovering, forward, backward or lateral flight merely by manipulation of the cyclic pitch control wheel 100 in desired direction of flight.

If he desires now to convert the aircraft into an airplane for high speed forward flight, he operates the cyclic pitch control wheel 100 in a direction that causes forward tilt of the plane of all rotor blades, e.g. 51a. This simultaneously causes the wing structure 14 to swing forwardly about its pivoting axis X—X from the vertical position of FIGURE 6 through the progressive positions of FIGURES 7 and 8 into the substantially horizontal position of FIGURE 2 at which time the coaxial propeller and rotor shafts assume a horizontally disposed position. During this shift of the wing structure 14, and approximately at the time it reaches horizontal position, the collective pitch control tubes, e.g. tube 62a, are manipulated by operation of the lever 133 in the cockpit to cause feathering of the propeller blades to substantially the 45° angle position shown in FIGURE 9 and simultaneously to impart feathering movement to all rotor blades so that they assume substantially horizontal position shown in FIGURE 9 with their leading edges L all lying head on into the wind. The rotor shafts are uncoupled from the engines by release of all the clutches, e.g. clutch 45a. The spinning rotor blades of the two rotors are brought to rest by giving them the slight negative pitch through action of the cam 93a just about the time the wing structure 14 has assumed its substantially horizontal position. When they stop rotating they are locked in the aileron position they occupy as shown in FIGURE 2 by operation of the locking pin 94a. At the same time since clutches like clutch 45a have been released, uncoupling the rotor drive shafts from the engines, on tightening of the clutches like clutch 39a, the engine rotary power now only will transmit to the propeller blades so that the propellers 17a and 17b then operate as ordinary air screws to move the craft forwardly through the air as an ordinary plane at high speed.

Since the blades of rotors 18a and 18b are now in substantially horizontal parallel disposition with the wing structure, they may act as auxiliary wings for additional lift. During this period they may be feathered or manipulated by operation of the cyclic control wheel 100 to function, for example, like flaps for changing elevation of the forwardly flying craft. In other words, manipulation of the cyclic control wheel 100 during this period changes the pitch of the rotor blades. This causes automatic changes or tilts of the wing structure 14 about its transverse axis X—X thus changing the attitude angle of the wing structure and hence the lift and consequently the elevation of the forwardly flying aircraft. The tail structure 12 thus becomes unnecessary for elevational control purposes and may either be omitted or utilized merely to stabilize the fuselage 11.

The same cyclic control member 100 is operated by the pilot to restore helicopter flight conditions in preparation for landing, it being merely necessary for the pilot to manipulate the cyclic control wheel 100 to cause pitch changes of the rotor blades sufficiently in such direction as to swing the wing structure 14 back to the position of FIGURE 1 by air reaction with the rotor blades whereupon the rotor shafts can be recoupled to the engines by clutch operation and the collective pitch control member 133 is manipulated to restore the rotor and propeller blades to the pitch conditions thereof necessary for helicopter flight. In this condition, the craft may then be landed as a conventional helicopter with usual pitch control manipulations of the rotor blades through the collective pitch control member 133 as well as by cyclic pitch control manipulation of the hand wheel 100.

It is to be noted that the shift or rotation of the wing structure 14 about its axis X—X for these various flight conditions requires no mechanical motive power and depends entirely upon the manipulation of the cyclic pitch control wheel 100 by the pilot. This is made possible because of the location of the axis X—X substantially along the center of pressure of the combined wing structure and its associated components which include the nacelles and rotors and propellers which are driven by the engines. This center of pressure is different from that of the wing structure 14 alone and lies substantially in alignment with the centers of gravity of the combined components so that free rotation about the axis X—X is possible at all times without the creation of any moment on the wing structure due either to wind or gravity.

Without confining the principles of design to any specific proportions, for purposes of illustration, the propeller diameter has been described as being equal to ⅓ of the rotor diameter together with a shaft speed three times as great.

Since the power to drive a rotor is proportional to the cube of the revolutions per minute, and to the fifth power of the diameter, and since it is desired that the rotor or the propeller take full engine power, the former in hovering as a helicopter and the latter in forward speed as an airplane, then to insure equal power absorption by rotor or propeller, the torque coefficients which are the remaining variables must be different for the two. This is demonstrated by examining the following formula:

$$\frac{\text{Power (Rotor)}}{\text{Power (Propeller)}} = \frac{C_T N^3 D^5}{C_{T_2} n^3 d^5} = \frac{C_T (1/3)^3 \times 3^5}{C_{T_2} (1)^3 \times 1^5} = \frac{C_T 3^2}{C_{T_2} 1} = \frac{C_T 9}{C_{T_2} 1}$$

where
$C_T$ = coefficient of torque of the rotor
$C_{T_2}$ = coefficient of torque of the propeller
$N$ = r.p.m. of rotor
$n$ = r.p.m. of propeller
$D$ = diameter of rotor
$d$ = diameter of propeller Thus the torque coefficients must vary by 1/9 i.e.

$$\frac{C_T}{C_{T_2}} = \frac{1}{9}$$

This is the approximate condition which maintains in comparing the torque coefficients of a lift rotor at 10° in hovering and a thrust propeller at high forward speed and 40° blade angle at 78% of chord (lift coefficients being the same).

The described ratios between propeller and rotor are only by way of example. Other considerations such as a greater solidity for the propeller could be met by choice of a different ratio between rotor and propeller diameters or choice of a different gear ratio.

It will be evident to persons skilled in the art that the variation of these factors is a question of design for the specific use to which the aircraft is to be put. For example, in aircraft practice it is conventional to run the engine over its normal speed for the short interval of take off and at a reduced speed thereafter. This could be done in the aircraft of this invention and would entail a greater r.p.m. ratio or alternatively a smaller diameter ratio between rotor and propeller.

It is to be noted that the wing structure 14 (FIGS. 1 and 2) includes the ailerons 14′a and 14′b. These ailerons are operable by conventional controls and also by another control at the cockpit to cause similar and like movement thereof. With the latter, they may be utilized as effective controls for pivoting the wing structure 14 on its transverse axis X—X. In other words, the rotors and/or propellers on the nacelles need not be feathered to effect a pivotal motion of the wing structure because the ailerons can be moved simultaneously in the same direction angularly relative to the surfaces of the wing structure. Then like tilt of the two ailerons will cause couples and thus rotate the wing structure 14 accordingly about the axis X—X. Thus tilting of the wing structure is not dependent upon feathering controls of the rotor and/or propeller.

Although the rotors have hereinabove been described as two bladed type, multi-bladed rotors may be utilized in place of the rotors 18a and 18b described, it being necessary in such case to provide cyclic and collective pitch control for each blade of the multi-blade rotor instead of merely for two blades. The showing in the drawings has been confined to the two blade rotor structure for simplicity of illustration without intention of limitation thereto. When multi-blade rotors are utilized, the additional controls for the additional blades are readily apparent to those skilled in the art to which this invention relates.

In addition, in the foregoing description, the inventive concept has been related specifically to operation of the aircraft by the use of coaxial rotor-propeller sets. The concepts of this invention may also be applied to aircraft in which jet engines are utilized to provide the thrust for forward flight. One way of accomplishing this is shown in FIGURE 13 which also includes multi-blade rotors. With such an arrangement, jet turbine type engines 16j replace rotary engines being located in the nacelles 15j. In a preferred embodiment, these jet engines 16j are so-called jet turbines whose thrust is used to provide high speed forward flight. With such engines, propellers similar to propeller 17a are no longer required. However, rotors 18j are utilized. These rotors may be double bladed rotors like rotors 18a and 18b, or as shown may be multi-bladed types.

A turbine drive arrangement Tj operated by each of the jet engines 16j is coupled through conventional reduction gearing Gj and clutch arrangements Cj to the drive shaft of its associated rotor 18j. The cyclic control (not shown) of the rotor blades 51j as well as the collective pitch control of these rotor blades may be operated from the cockpit of the plane in substantially the same way as that described hereinabove for the first modification. The mechanism, of course, is simplified because of the fact that neither a propeller shaft, nor a collective pitch control for propeller blades is required.

In operation, as with the first embodiment, the wing structure 14j assumes a position similar to that of FIGURE 1 for take off as a helicopter. When the jet engines are started, the rotor turning clutches Cj are thrown in a connected position so that the reduction gearing Gj serve to drive the rotors 18j. The pilot then takes off as a helicopter. Once required elevation has been achieved, either aileron or pitch control of the rotor blades as previously described is utilized to cause the wing structure 14j to swing to the airplane phase, that is, a horizontal position as shown in FIGURE 13. At the same time, the rotors are declutched from the jet engines 16j and each rotor is brought to a stop and locked in the condition shown in FIGURE 13 by similar type of collective pitch control operation as described hereinabove with respect to the rotor-propeller driven aircraft at which time the leading edges Lj of all blades face into the wind. The continued operation of the jet engines thereafter provide forward high speed thrust for the aircraft as an airplane. The rotors 18j at this time being locked in position with their leading edges into the wind can serve as additional suporting surfaces in the manner hereinbefore described. It is to be noted that at take off in the helicopter phase, the thrust of the jet engines 16j may assist such take off because their thrusts then act against the ground.

The disposition of the pivoting axis of wing structure 14j should meet similar requirements as those noted for the axis X—X of wing 14. Thus it should coincide with the line representing the center of pressure of the wing structure 14j as a totality (wings, nacelles, jet engines and rotors). Moreover, the center of gravity of the combined wing structure as a totality should also be close to the pivoting axis of said wing structure 14j.

While specific embodiments of the invention have been described, variations within the scope of the appended

What is claimed is:

1. Convertible aircraft of the character described comprising a fuselage, wing structure pivotally supported for free rotation about an axis transverse to the fuselage, coaxial rotor-propeller sets each comprising a separate rotor and a separate propeller carried by the wing structure, engine means for driving the rotor-propeller sets, and cyclic pitch control means for the rotors to effect automatic wing structure pivoting about said axis in accord with selected helicopter and airplane flight conditions.

2. Convertible aircraft of the character described comprising a fuselage, wing structure pivotally supported for free rotation about an axis transverse to the fuselage, coaxial rotor-propeller sets each comprising a separate rotor and a separate propeller carried by the wing structure, engine means for driving the rotor and propeller of each set in a common direction, and control means for the rotors and propellers to effect propeller and rotor feathering, cyclic pitch changes of the rotor and wing pivoting about said axis in accord with selected helicopter and airplane flight conditions.

3. Convertible aircraft adapted selectively for helicopter type and airplane type flight comprising a fuselage, wing structure pivotally supported for free rotation on an axis transverse of the fore and aft direction of the fuselage, rotor-propeller sets, each set comprising a separate rotor and a separate propeller both mounted for coaxial rotation, collective control means for feathering the rotors and propellers of each set from a common location and cyclic pitch control means for the rotors of each set operable simultaneously from said location, said last-named means providing selective tilt of the planes of rotation of the rotors and pitch control of the rotors to effect selected pivoting action of the wing structure on said axis as required by the selected type of flight.

4. Convertible aircraft of the character described comprising a fuselage, wing structure pivotally supported by the fuselage for rotation on an axis transverse to the fore and aft direction of the fuselage, nascelles on the wing structure, a coaxial pair of shafts in each nascelle, engine means for driving each pair of shafts, propellers, one mounted on one of each pair of shafts, rotors one mounted on the second one of each pair of shafts, and means for controlling the rotors to effect pivotal motion of the wing structure on said axis as required for selective flight of the aircraft as a helicopter or as an airplane.

5. Convertible aircraft adapted for selected flight of the helicopter and airplane types comprising a fuselage, wing structure pivotally supported for rotation about an axis transverse to the fore and aft direction of the fuselage, a pair of feathering rotor-propeller sets, means for supporting the respective sets at outer ends of said wing structure, coaxial pairs of rotor and propeller shafts, one pair for each set, engine means for driving one pair of the coaxial shafts in a common direction and oppositely to the common drive direction of the second pair of coaxial shafts, collective feathering control means of each rotor-propeller set, means for simultaneously operating the last-named means from a common location in the fuselage, cyclic control means for the rotor of each set and means for simultaneously operating said last-named means from said common location.

6. Convertible aircraft adapted for selected flight of the helicopter and airplane types comprising a fuselage, wing structure pivotally supported for rotation about an axis transverse to the fore and aft direction of the fuselage, a pair of feathering rotor-propeller sets, means for supporting the respective sets at outer ends of said wing structure, coaxial pairs of rotor and propeller shafts, one pair for each set, engine means for driving one pair of the coaxial shafts in a common direction and oppositely to the common drive direction of the second pair of coaxial shafts, collective feathering control means of each rotor-propeller set, means for operating the last-named means from a common location in the fuselage, cyclic control means for the rotor of each set and means for operating said last-named means from said common location.

7. Convertible aircraft adapted selectively for helicopter type flight and airplane type flight comprising a fuselage, wing structure pivotally supported for rotation about an axis transverse to the fore and aft direction of the fuselage, feathering rotor-propeller sets, the sets being carried at symmetrically spaced apart points by the wing structure and each set being mounted for coaxial rotation of its rotor and its propeller, collective control means for feathering the rotor and propeller of each set, cyclic control means for feathering the rotor of each set and for providing tilt of the plane of rotation of such rotor to effect selected pivoting action of the wing structure on said axis as required by the selected type of flight, engine means for rotating each rotor-propeller set, and clutch means for the rotor of each set for coupling each rotor to the engine means during helicopter type flight and for uncoupling each rotor from the engine means during airplane type flight.

8. Convertible aircraft of the character described comprising a fuselage, wing structure symmetrically disposed relative to the fuselage and pivotally supported therefrom for free rotation on an axis lying substantially along the center of pressure of the wing structure combined with its associated components, said associated components comprising nascelles carried by the wing structure, and a rotor-propeller set comprising a separate rotor and a separate propeller for each nascelle, an engine in each nascelle for driving the rotor propeller set thereof, cyclic control means for the rotors, collective control means for the rotors and propellers, and operating means for both said control means located at a centralized position in the fuselage.

9. Convertible aircraft of the character described comprising a fuselage, wing structure symmetrically disposed relative to the fuselage and pivotally supported therefrom for free rotation on an axis lying substantially along the center of pressure of the wing structure combined with its associated components, said associated components comprising nascelles carried by the wing structure, and a rotor-propeller set comprising a separate rotor and a separate propeller for each nascelle, an engine in each nascelle for driving the rotor propeller set thereof, cyclic control means for the rotors and collective control means for the rotors and propellers, said collective control means including means for moving the leading edges of the rotors head-on into the wind during forward flight of the aircraft.

10. Convertible aircraft of the character described comprising a fuselage, wing structure pivotally supported by the fuselage for rotation on an axis lying substantially at the center of pressure of the wing structure combined with its associated components, said associated components comprising nascelles carried by the wing structure, coaxial pairs of shafts in the respective nascelles, propellers, one on one shaft of each pair of shafts, and rotors, one on the second shaft of each pair of shafts, engines in said nascelles cyclic control means for the rotors for effecting pivotal movement of the wing structure about said axis to desired vertical or horizontal flight positions of the wing structure, and collective pitch control means for the propellers and rotors.

11. Convertible aircraft of the character described comprising a fuselage, wing structure pivotally supported by the fuselage for rotation on an axis lying substantially at the center of pressure of the wing structure combined with its associated components, said associated components comprising nascelles carried by the wing structure, coaxial pairs of shafts in the respective nascelles and propellers and rotors mounted on respective shafts of the pairs of engines in said nascelles, and cyclic control means for the rotors for effecting pivotal movement of the wing structure about said axis into helicopter or airplane flight positions of the wing structure.

12. Convertible aircraft of the character described comprising a fuselage, wing structure pivotally supported by the fuselage, nascelles carried by the wing structure, coaxial shafts in each nascelle, a propeller carried by one of the coaxial shafts, a rotor of larger diameter than the propeller carried by the other coaxial shaft, common motive power for rotating both coaxial shafts in each nascelle, collective pitch control means for feathering the propeller and the rotor of each nascelle, and cyclic pitch control means for the rotor of each nascelle, and operating means for said both control means at a common location in the aircraft.

13. Convertible aircraft of the character described comprising a fuselage, wing structure pivotally supported by the fuselage and having wing sections extending laterally from opposite sides of the fuselage, a nascelle carried by each wing, an engine mounted in each nascelle, a pair of coaxial shafts in each nascelle adapted to be driven by the engine therein, a propeller mounted on one of each pair of coaxial shafts, a rotor mounted on the other of each pair of coaxial shafts, collective pitch control means for propellers and for the rotors, and cyclic pitch control means for the rotors, the pivotal axis of said wing structure being located at the center of pressure of the combined wing structure, propellers, rotors, engines and nascelles whereby pivotal rotation of the wing structure on said axis may be effected directly by manipulation of the cyclic pitch control means to position the wing structure for helicopter type or for airplane type of flight as may be desired.

14. Convertible aircraft adapted for helicopter and for airplane types of flight comprising a fuselage, wing structure pivotally supported by the fuselage for rotation about an axis transverse to the fore and aft direction of the fuselage into substantially vertical chord position for helicopter flight and into substantially horizontal chord position for forward flight, a pair of coaxial shafts symmetrically disposed on the wing structure at opposite sides of the fuselage, engine means for driving each pair of shafts, a multi-blade propeller on one shaft of each pair, a double bladed rotor of larger diameter than the propeller on the other shaft of each pair, collective pitch control means for the blades of the propellers and the rotors, cyclic pitch control means for the blades of the rotors, and means for locking the rotors in airfoil position during forward flight.

15. Convertible aircraft adapted for helicopter and for airplane types of flight comprising a fuselage, wing structure pivotally supported by the fuselage for rotation about an axis transverse to the fore and aft direction of the fuselage into substantially vertical chord position for helicopter flight and into substantially horizontal chord position for forward flight, a pair of coaxial shafts symmetrically disposed on the wing structure at opposite sides of the fuselage, engine means for driving each pair of shafts, a multi-blade propeller on one shaft of each pair, a double bladed rotor of larger diameter than the propeller on the other shaft of each pair, collective pitch control means for the blades of the propellers and the rotors, cyclic pitch control means for the blades of the rotors, cam means for bringing the rotors to rest in airfoil position for forward flight, and means for locking the rotors in airfoil position during forward flight.

16. Convertible aircraft adapted for selective helicopter type and airplane type of flight comprising a fuselage, wing structure pivotally supported by the fuselage for rotation about an axis transverse to fore and aft direction of the fuselage into substantially vertical chord position for helicopter type flight and into substantially horizontal chord position for airplane type flight, a pair of rotor-propeller sets symmetrically disposed on the wing structure at opposite sides of the fuselage, engines for rotating the rotor-propeller sets, said axis being disposed substantially at the center of pressure of the combined wing structure and rotor-propeller sets, collective pitch control means for changing the pitch of the propellers from zero through 45° and of the rotors from zero through 90°, cyclic pitch control means in addition for the rotors, common operating means for said collective pitch control means, and common operating means for said cyclic pitch control means, said two common operating means being positioned at a centralized location in the aircraft.

17. Convertible aircraft of the character described comprising a fuselage, wing structure freely pivoted for rotation about an axis transverse to the fuselage, engine means for driving the aircraft selectively as a helicopter and as an airplane, rotor means adapted to be driven by said engine means when said craft is to be operated as a helicopter, means for operating the rotor means to position all leading edges thereof head-on into the wind when said aircraft is operated as an airplane, and control means to effect automatic wing structure pivoting about said axis in accord with selected helicopter and airplane flight conditions.

18. Convertible aircraft operable selectively as a helicopter and an airplane comprising a fuselage, wing structure freely pivoted for rotation about an axis transverse to the fuselage, jet engine means for propelling the aircraft as an airplane, rotors adapted to be driven by said engine means for effecting flight of the aircraft as a helicopter, means for operating said rotors to position all leading edges thereof head-on into the wind when said aircraft is operated as an airplane, and control means to effect automatic pivoting of said wing structure about said axis in accord with selected helicopter and airplane flight conditions.

19. Convertible aircraft of the character described comprising a fuselage, wing structure supported pivotally on an axis transverse to the fuselage for free rotation, rotor means mounted on said wing structure, means for driving the rotor means during the operation of the aircraft, and cyclic pitch control means for the rotor means for positioning the freely pivoted wing structure about said axis to change wing angle as required for selected flight of the aircraft.

20. Convertible aircraft of the character described comprising a fuselage, wing structure supported pivotally by the fuselage for free rotation about a center of pressure axis, rotor means mounted on said wing structure, means for driving the rotor means during the operation of the aircraft and cyclic pitch control means for the rotor means for positioning the freely pivoted wing structure about said axis to change wing angle as required for selected flight of the aircraft .

21. Convertible aircraft of the character described comprising a fuselage, wing structure having the center of gravity thereof disposed chordwise substantially on the center of pressure axis of said wing, said wing structure supported pivotally by the fuselage for free rotation about said center of pressure axis, rotor means mounted on said wing structure, means for driving the rotor means during the operation of the aircraft and control means for positioning the freely pivoted wing structure about said axis to change wing angle as required for selected flight of the aircraft.

22. Convertible aircraft of the character described comprising a fuselage, wing structure supported pivotally by the fuselage for free rotation about a center of pressure axis that is transverse to the fuselage, rotor means mounted on said wing structure, means for driving the rotor means during operation of the aircraft as a helicopter, separate means for propelling the aircraft forwardly as an airplane, and control means for positioning the freely pivoted wing structure about said axis to change wing angle as required for selected flight of the aircraft.

23. Convertible aircraft of the character described comprising a fuselage, a pivoted wing structure supported by the fuselage for free rotation on a pivot axis, engine driven rotors supported by the wing, cyclic control means for the rotors, separate thrust means for high speed forward flight as an airplane, means for declutching the engine driven rotors during such forward flight, and means for positioning the blades of the rotors at zero pitch with all leading edges thereof head-on with the relation to the oncoming wind during such forward flight.

24. Convertible aircraft of the character described comprising a fuselage, a pivoted wing structure supported by the fuselage for free rotation on a pivot axis, engine driven rotors supported by the wing, said wing pivot axis lying coincident with the aerodynamic center of pressure of said wing, cyclic control means for the rotors, separate thrust means for high speed forward flight as an airplane, means for declutching the engine driven rotors during such forward flight, and means for positioning the blades of the rotors at zero pitch with all leading edges thereof head-on with relation to the oncoming wind during such forward flight.

25. Convertible aircraft of the character described comprising a fuselage, a pivoted wing structure supported by the fuselage for free rotation on a pivot axis, engine driven rotors supported by the wing, said wing pivot axis lying coincident with the aerodynamic center of pressure and the chordwise location of the center of gravity of said wing, cyclic control means for the rotors, separate thrust means for high speed forward flight as an airplane, means for declutching the engine driven rotors during such forward flight, and means for positioning the blades of the rotors at zero pitch with all leading edges thereof head-on with relation to the oncoming wind during such forward flight.

References Cited in the file of this patent
UNITED STATES PATENTS

| | | |
|---|---|---|
| 1,951,817 | Blount | Mar. 20, 1934 |
| 2,382,824 | Solomon | Aug. 14, 1945 |
| 2,444,781 | Leonard | July 6, 1948 |
| 2,478,847 | Stuart | Aug. 9, 1949 |
| 2,621,001 | Roman | Dec. 9, 1952 |
| 2,708,081 | Dobson | May 10, 1955 |
| 2,848,181 | Landers | Aug. 19, 1958 |
| 2,959,373 | Zuck | Nov. 8, 1960 |

FOREIGN PATENTS

| | | |
|---|---|---|
| 1,081,995 | France | June 16, 1954 |